(12) United States Patent
Yoshizawa

(10) Patent No.: US 8,055,383 B2
(45) Date of Patent: Nov. 8, 2011

(54) PATH PLANNING DEVICE

(75) Inventor: Shintaro Yoshizawa, Gotemba (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 1134 days.

(21) Appl. No.: 11/815,111

(22) PCT Filed: May 1, 2006

(86) PCT No.: PCT/JP2006/309436
§ 371 (c)(1),
(2), (4) Date: Jul. 31, 2007

(87) PCT Pub. No.: WO2006/121091
PCT Pub. Date: Nov. 16, 2006

(65) Prior Publication Data
US 2009/0019410 A1    Jan. 15, 2009

(30) Foreign Application Priority Data
May 13, 2005   (JP) ................................. 2005-141661

(51) Int. Cl.
*G05B 19/19*   (2006.01)
*G05B 19/41*   (2006.01)
*G05B 19/04*   (2006.01)

(52) U.S. Cl. ............ 700/255; 700/250; 700/252; 901/2; 901/14; 318/568.15

(58) Field of Classification Search ................. 703/2, 7, 703/13; 700/33, 62, 61, 56, 252, 213, 245, 700/250, 255; 701/206, 300; 901/2, 14, 901/50; 318/568.15, 573

See application file for complete search history.

(56) References Cited

U.S. PATENT DOCUMENTS

| | | | | |
|---|---|---|---|---|
| 5,808,887 A * | 9/1998 | Dorst et al. | .................... | 345/474 |
| 5,887,121 A * | 3/1999 | Funda et al. | ................... | 700/263 |
| 6,004,016 A * | 12/1999 | Spector | ............................ | 700/56 |
| 6,064,809 A * | 5/2000 | Braatz et al. | ....................... | 703/2 |
| 6,311,098 B1 * | 10/2001 | Higasayama et al. | ......... | 700/159 |
| 6,643,563 B2 * | 11/2003 | Hosek et al. | .................. | 700/245 |

(Continued)

FOREIGN PATENT DOCUMENTS

JP         7-253809        10/1995

(Continued)

OTHER PUBLICATIONS

Lavalle, Steven M. et al., "Randomized Kinodynamic Planning", IEEE Int. Conf. on Robotics and Automation, pp. 1-37, 1999.

(Continued)

*Primary Examiner* — Thomas Black
*Assistant Examiner* — Christine Behncke
(74) *Attorney, Agent, or Firm* — Oblon, Spivak, McClelland, Maier & Neustadt, L.L.P.

(57) ABSTRACT

A path generating device 1 has a constraint mid-configuration generator 10. The constraint mid-configuration generator 10 defines a constraint surface in a joint angle space. The path generating device 1 probabilistically generates a mid-configuration in the joint angle space. The constraint mid-configuration generator 10 projects the probabilistically generated mid-configuration onto the constraint surface to generate a projected mid-configuration. Projected mid-configurations generated in this manner are joined to generate a path that does not interfere with any obstacle (environmental object) in a work space.

6 Claims, 11 Drawing Sheets

U.S. PATENT DOCUMENTS 6,801,810 B1 * 10/2004 Poncet .......................... 700/12
2007/0005179 A1 * 1/2007 Mccrackin et al. .......... 700/213

FOREIGN PATENT DOCUMENTS

| JP | 8-16240 | 1/1996 |
| JP | 11-179682 | 7/1999 |
| JP | 2000-15595 | 1/2000 |
| JP | 2002-331479 | 11/2002 |
| JP | 2003-58907 | 2/2003 |
| JP | 2003-256025 | 9/2003 |
| JP | 2005-309990 | 11/2005 |
| JP | 2006-48372 | 2/2006 |

OTHER PUBLICATIONS

Craig, John J., "Robotics—a system, dynamics and control—(Chapter 7)", Hirohumi Miura Isao Shitayama translations and Kyoritsu Shuppan Corp.

Yakey, Jeffery H. et al., "Randomized Path Planning for Linkages with Closed Kinematic Chains", IEEE Transactions on Robotics and Automation, vol. 17, No. 6, pp. 951-959, 2001.

Jaillet, Leonard et al., "Adaptive Tuning of the Sampling Domain for Dynamic-Domain RRTs", IEEE International Conference on Intelligent Robots and Systems, 2005.

* cited by examiner

PATH PLANNING DEVICE

TECHNICAL FIELD

The present invention relates to a path planning apparatus for planning an operation path of the whole or a part of an automated machine.

BACKGROUND ART

For moving a robot or for automatically operating a robot arm, it becomes necessary to plan a path thereof. "Randomized Kinodynamic Planning: S. M. LaValle and J. J. Kuffner, Jr.: Proc of IEEE Int. Conf. on Robotics and Automation, 1999" ("Non-patent Document 1" hereinafter) describes path planning using a stochastic mechanism. In the method described in Non-patent Document 1, one goal (final position: final configuration) is set for one start position (initial position: initial configuration), and a path is set via at least one midpoint (intermediate position: intermediate configuration) between them. At this time, a search space is, for example, a joint coordinate space in the planning of the path based on the midpoint, and the midpoint is set only one at a time.

The path setting using the search space such as the joint coordinate space is described in "Introduction to Robotics: Mechanics and Control (Chapter 7), authored by John J. Craig and translated by Hirofumi Miura and Isao Shimoyama, Kyoritsu Shuppan Co., Ltd., Gazette No. 109641" (Non-patent Document 2" hereinafter). Non-patent Document 2 describes a joint space method of describing a spatial-temporal path by a function of joint angle, as a method for determining a desired path of a robot in a space. In the joint space method, at least one midpoint is set between a start position (initial position) and a goal position (final position) of a path, and these are connected by a spline curve to generate a path.

DISCLOSURE OF THE INVENTION

However, since the path planning method described in Non-patent Document 1 above is designed to probabilistically generate a mid-configuration by use of randomness (probability), much thought is not given to the configuration of the robot or the like moving on the path. For this reason, the configuration of the robot also becomes random, and, for example, in a case where the robot is used to move a glass filled with liquid, the configuration of the robot cannot be controlled so as to keep the liquid from spilling out.

For example, where the robot is a multijoint robot having degrees of freedom according to the number of joints, it is necessary to generate a mid-configuration connecting an initial configuration and a final configuration of the robot so as to satisfy a constraint, in order to determine a configuration and path to move the robot to the final position without spilling the liquid.

When such mid-configurations are generated as described above, a configuration connecting a mid-configuration satisfying the constraint and a mid-configuration satisfying the constraint could deviate from the constraint. If this deviation is large, it becomes necessary to correct the path so as to compensate for the deviation, which poses a problem that this correction increases computational complexity.

An object of the present invention is therefore to provide a path planning apparatus being adapted to plan a path in movement of a moving object from an initial position to a final position and being capable of efficiently planning a path in which a configuration of the moving object satisfies a constraint.

A path planning apparatus according to the present invention, which achieves the above object, is a path planning apparatus for planning a path in movement of a moving object from an initial position to a final position, which is adapted to probabilistically generate a midpoint between the initial position and the final position and to plan a path between the initial position and the final position, using the midpoint, the path planning apparatus comprising: constraint setting means for setting a constraint subspace satisfying a constraint to constrain a configuration of the moving object in a work space where the moving object exists, in a movable space defined based on degrees of freedom of the moving object to determine a configuration of the moving object; midpoint generating means for generating a constraint midpoint by projecting a midpoint probabilistically generated in the movable space, onto the constraint subspace; and path generating means for generating a path connecting the initial position and the final position, using the constraint midpoint.

In the path planning apparatus according to the present invention, the constraint for maintaining the configuration of the moving object is set in the movable space. The constraint midpoint is generated based on this constraint, whereby the path can be efficiently planned while maintaining the configuration of the moving object. In the present specification, a space determined by degrees of freedom for operation like the joint coordinate space of the robot will be referred to as a movable space. The movable space shall be synonymous with the search space. Furthermore, since it is difficult to probabilistically generate a midpoint satisfying a constraint, the present invention adopts the way of generating the constraint midpoint by projecting the probabilistically generated midpoint onto the constraint subspace. For this reason, the present invention enables generation of the path approximately satisfying the constraint and thus reduces computational complexity.

Another path planning apparatus according to the present invention, which achieves the aforementioned object, is a path planning apparatus for planning a path in movement of a moving object from an initial position to a final position, which is adapted to probabilistically generate a midpoint between the initial position and the final position and to plan a path between the initial position and the final position, using the midpoint, the path planning apparatus comprising: constraint setting means for setting a constraint subspace satisfying a constraint to constrain a configuration of the moving object in a work space where the moving object exists, in a movable space defined based on degrees of freedom of the moving object to determine a configuration of the moving object; midpoint generating means for setting a constraint ellipsoid satisfying an arbitrary position satisfying the constraint, and a neighborhood point near the arbitrary position, in the movable space, defining a probability distribution, using the constraint ellipsoid, and generating a constraint midpoint satisfying the constraint, based on the probability distribution; and path generating means for generating a path connecting the initial position and the final position, using the constraint midpoint.

In the path planning apparatus according to the present invention, the constraint ellipsoid is defined and the midpoint is generated based thereon. A path can be calculated by generating such a constraint ellipsoid. When the midpoint in the movable space is generated based on the probability distribution defined using the constraint ellipsoid, the path approximately satisfying the constraint can be generated, which can reduce computational complexity.

The apparatus can be arranged in a form further comprising path correcting means for correcting the generated path, based on the constraint. When the generated path is corrected based on the constraint in this manner, the path can be generated in a state in which the configuration of the moving object is maintained more securely.

The apparatus can also be arranged in a form wherein the constraint setting means defines the constraint subspace satisfying the constraint in the movable space, as the constraint, and wherein the path correcting means corrects the path by projecting the path generated by the path generating means, onto the constraint subspace.

When the path generated by the path generating means is projected onto the constraint subspace in this manner, the path can be readily corrected.

Furthermore, the apparatus can also be arranged in a form wherein if a distance between the path generated by the path generating means and a constraint surface is not less than a predetermined value, the path correcting means performs a projection onto the constraint surface to correct the path. When the path is corrected in this manner if the distance between the path and the constraint surface is not less than the predetermined value, the correction can contribute to reduction in computational complexity.

The apparatus can also be arranged in a form wherein the path correcting means performs the projection, at every predetermined interval in the path generated by the path generating means. When the projection is performed at every predetermined interval in this manner, a contribution can be made to reduction in computational complexity. The predetermined interval herein is desirably determined on the basis of a distance in the movable space.

Furthermore, the apparatus can be arranged in a form wherein the constraint setting means sets the constraint, based on an equation defined by an inner product of a vector resulting from mapping of a variable in the movable space into the work space, and basis vectors of the work space.

When the inner product of vectors spanning an orthogonal space (the basis vectors of the work space) and a vector defining a configuration (the vector resulting from mapping of the variable in the movable space into the work space) is used in this manner, the path can be suitably calculated.

The scope of further application of the present invention will become apparent from the following detailed description of the invention. It is, however, noted that the detailed description and specific examples provide preferred embodiments of the present invention but are presented by way of illustration only, and it is apparent that various modifications and improvements in the spirit and scope of the present invention are obvious to those skilled in the art, in view of the detailed description.

BEST MODE FOR CARRYING OUT THE INVENTION

Figure 1:
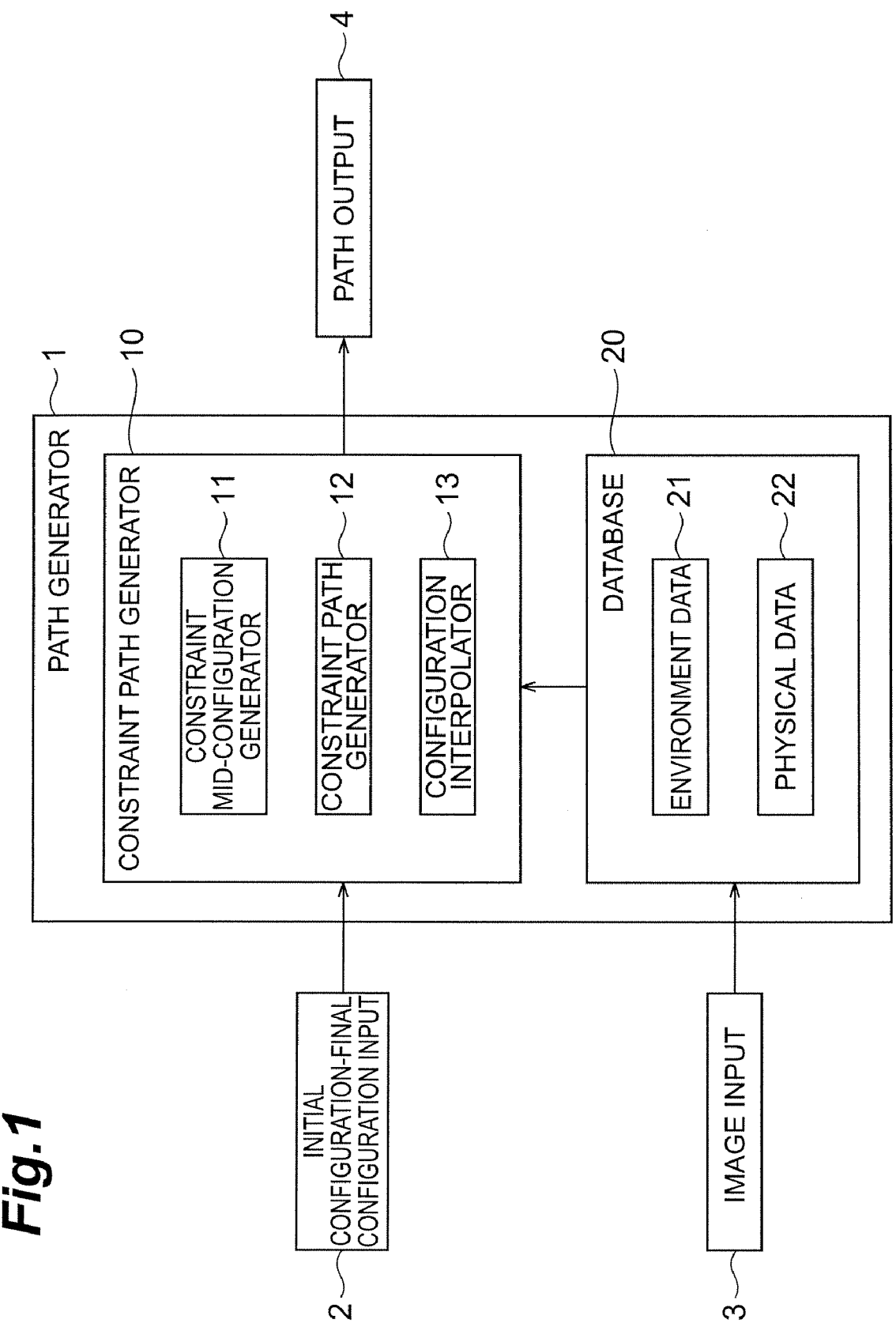
FIG. 1 is a block configuration diagram of a path planning apparatus according to the present invention.

Embodiments of the present invention will be described below with reference to the drawings. In each of the embodiments, portions with identical functionality will be denoted by the same reference symbols, while omitting redundant description. First, the first embodiment of the present invention will be described. FIG. 1 is a block configuration diagram of a path planning apparatus according to the first embodiment.

Figure 2:
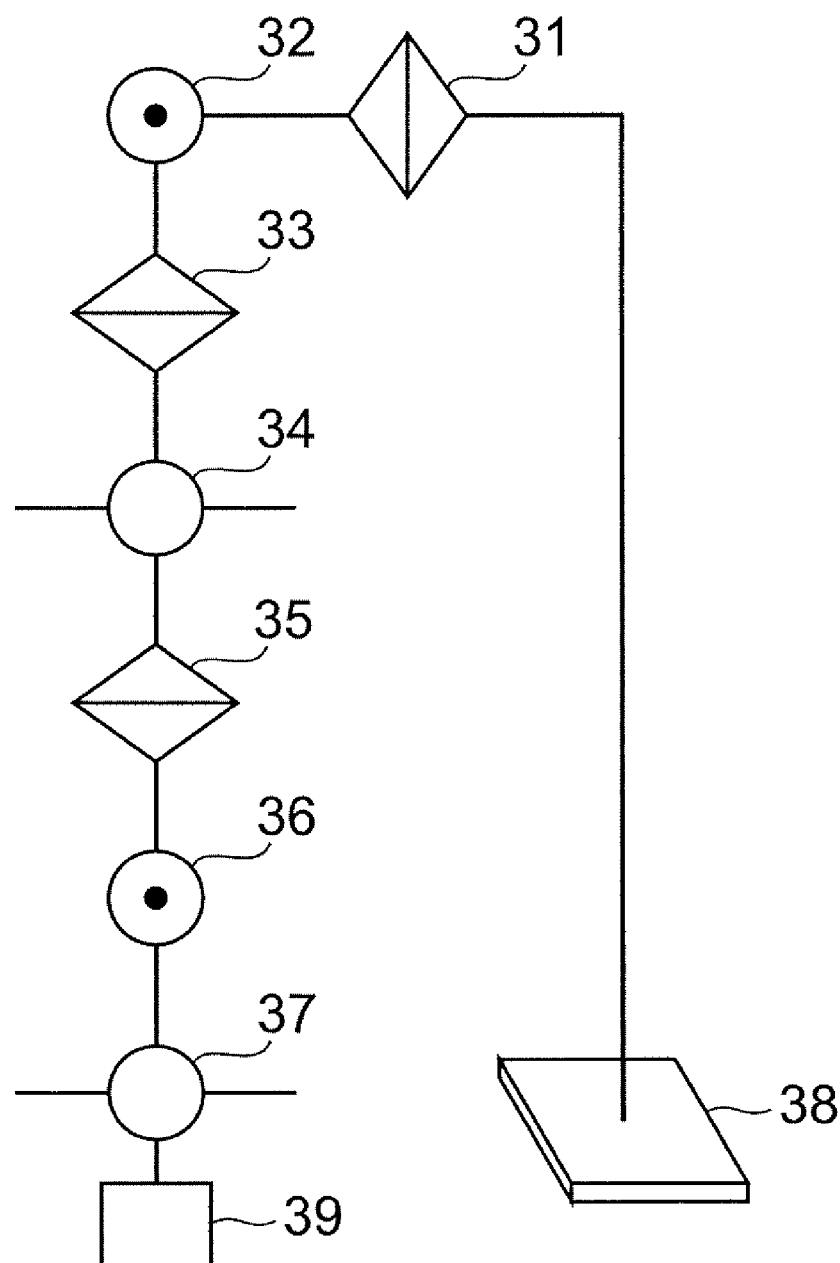
FIG. 2 is an explanatory diagram showing a configuration of degrees of freedom of an arm.

The path planning apparatus according to the present embodiment is provided with a path generating device 1, as shown in FIG. 1. The path generating device 1 has a constraint path generating device 10 and a database 20, and an initial configuration-final configuration input device 2 and an image input device 3 are connected to the path generating device 1. A path output device 4 is also connected to the path generating device 1. Specifically, the path generating device 1 is constructed of a computer. A robot arm (automated machine, which will be referred to hereinafter as "arm") 5, which is a moving object of the present invention schematically shown in FIG. 2, is connected to the path output device 4, and the path output device for the arm 5 outputs an operation path and configuration to the arm 5.

The initial configuration-final configuration input device 2 sets a current position and current configuration of the arm 5 as an initial configuration, and outputs information about the initial configuration and information about a preliminarily-designated target configuration to the constraint path generating device 10. The image input device 3 is a device for acquiring surrounding information of the arm 5, particularly, an obstacle as an external environment, and equipped with a camera or the like as an image information acquiring device. The image input device 3 processes acquired image information and outputs the processed information to the database 20. The image input device 3 can include a camera, or an information acquiring device such as various sensors, and may also include a keyboard, an optical disk drive, or the like.

The path output device 4 makes the arm 5 operate along a path generated by the path generating device 1. This path output device 4 is a device connected to the arm 5 and configured to output an operation path and configuration to the arm 5, and may also include a device that is connected to a monitor, a printer, or a drive handling a storable medium and that displays, prints, or stores an operation path and configuration.

The constraint path generating device 10 in the path generating device 1 is provided with a constraint mid-configuration generator 11 serving as the midpoint generating means and the constraint setting means of the present invention, a constraint path generator 12, and a configuration interpolator 13 serving as the path correcting means of the present invention. The database 20 stores environment data 21 and physical data 22. The environment data 21 stores data about an environment in which the arm 5 is installed. The physical data 22 stores specifications such as lengths and thicknesses between links 31-37 of the arm 5, and movable ranges of the respective links 31-37.

The constraint mid-configuration generator 11 generates such a plurality of mid-configurations connecting the initial configuration and the final configuration as to satisfy a constraint for the configuration of the arm 5. In the present specification, when a "configuration" is stated, it shall have a meaning including a position where the configuration is taken. Therefore, the initial configuration and final configuration mean configurations at the initial position and at the final position of the present invention, and a mid-configuration means a configuration at a mid-position.

The constraint mid-configuration generator 11 outputs the generated mid-configurations to the constraint path generator 12. The constraint path generator 12 uses the output mid-configurations and connects these mid-configurations to generate a path connecting the initial configuration and the final configuration fed from the initial configuration-final configuration input device 2.

The constraint path generator 12 outputs the generated path to the configuration interpolator 13. The configuration interpolator 13 generates an interpolation configuration as follows: when it interpolates a configuration between a mid-configuration and a mid-configuration on the path fed from the constraint path generator 12, the interpolation configuration approximately satisfies the constraint.

In this way, the path and configurations generated by the constraint path generating device 10 are fed from the constraint path generating device 10 to the path output device 4.

The database 20 is specifically constructed of a hard disk, a ROM, or the like, and stores the environment data 21 as knowledge (information already retained as knowledge) and data fed from the image input device 3. Environment information newly imported into the database 20 is accumulated in the environment data 21 as knowledge thereafter. The physical data 22 stores information about various members such as links and motors of the arm 5.

The arm 5 is provided with seven links (joints), first link 31 to seventh link 37, and the arm 5 has seven degrees of freedom. An actuator (motor) is built in each of the links 31-37 so as to be able to adjust an angle of each link.

Figure 3:
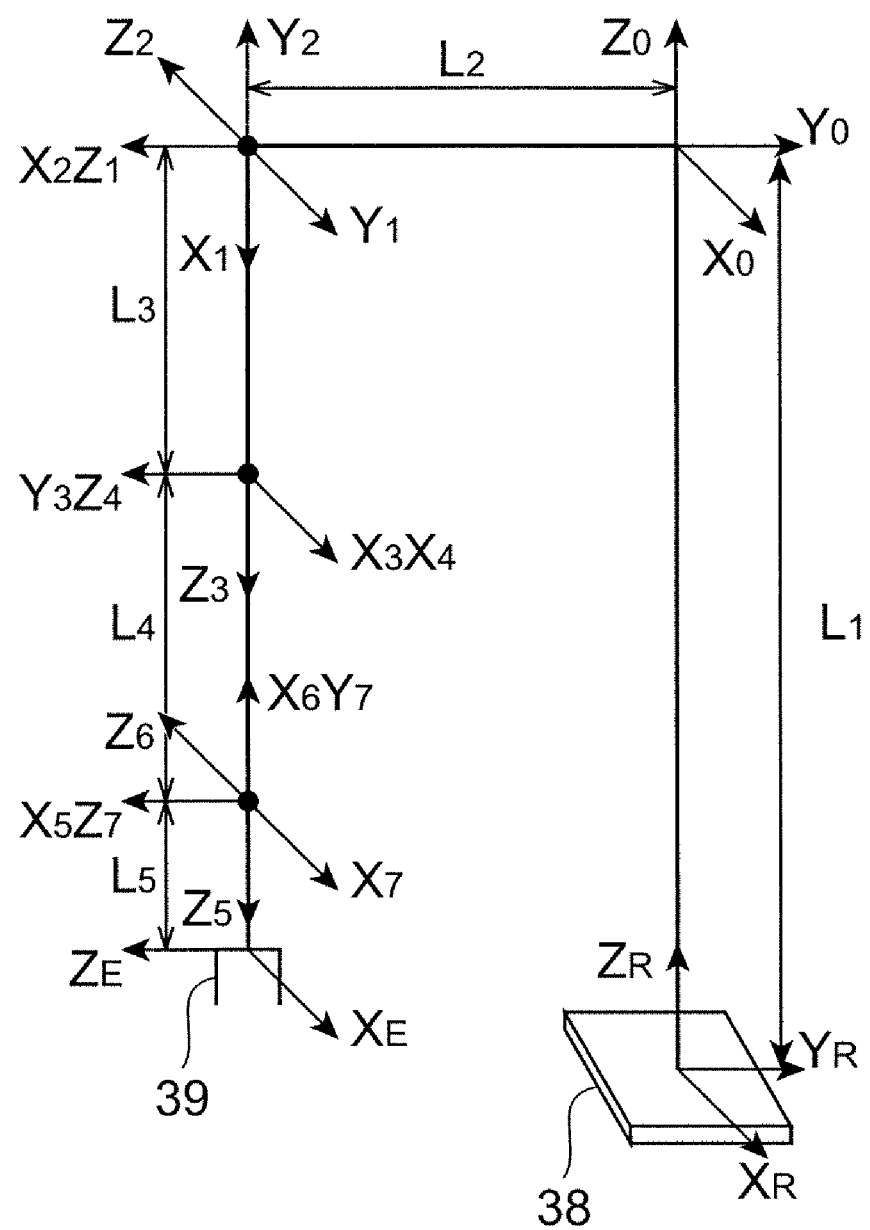
FIG. 3 is an explanatory diagram showing a relation among coordinate systems at respective links of an arm.

A link coordinate system is set in a work space where the arm 5 exists, for each of the links 31-37 in this arm 5. How to set the link coordinate systems is as follows: a Z-axis is taken along a direction of a rotational axis of each link 31-37, an appropriate X-axis is then determined, and a Y-axis is determined so as to establish a right-handed system. FIG. 3 shows link coordinate systems determined as described above. In the link coordinate systems shown in FIG. 3, numerals of subscripts denote joint numbers. The first link 31 to seventh link 37 are disposed on a base 38, and a hand 39 is attached to a tip of the seventh link 37. Link lengths are denoted by $L_n$.

A transformation between link coordinate systems can be made as follows. Supposing the link coordinate system of the first link 31 is associated with the base coordinate system of the arm 5, a transformation between them is given by $^1T_7$. A coordinate system to indicate a positional configuration of the hand 39 attached to the seventh link 37 is represented by $^7T_E$ relative to the coordinate system of the seventh link 37. Furthermore, the base coordinate system of the arm 5 is represented by $^RT_1$ relative to a reference coordinate system. In this case, the hand 39 has the positional configuration represented by Eq (1) below relative to the reference coordinate system.

$$^RT_E = {}^RT_1 {}^1T_7 {}^7T_E \qquad (1)$$

A position vector r of the hand 39 is determined by this $^RT_E$, and $^1T_7$ is a function of joint transformation vectors; therefore, by giving values of link parameters, we can obtain a relational expression r=f(q) between the joint transformation vectors of the arm with seven degrees of freedom and the vector r at the hand position with respect to the base coordinate system.

Next, a path planning method according to the present embodiment will be described. The path planning method according to the present embodiment will be described about control of the arm 5 under a predetermined constraint, specifically, in a state in which the arm 5 maintains a predetermined configuration. As an example of maintaining the predetermined configuration, we will describe a situation in which the hand 39 attached to the tip of the arm 5 grasps a glass, carries it to a predetermined mount surface, and places it on the surface, while moving the glass without spilling a liquid in the glass.

Figure 5:
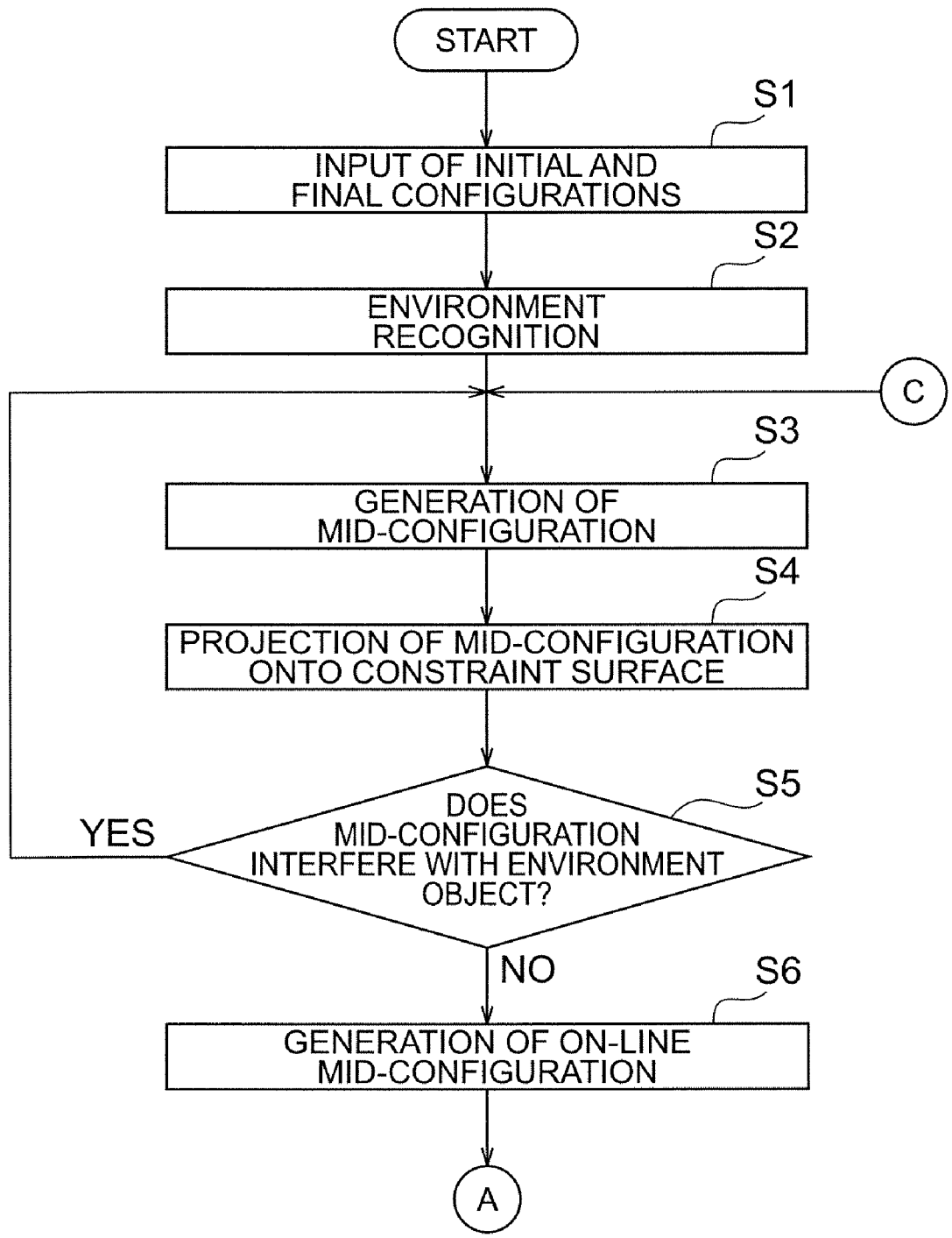
FIG. 5 is a flowchart showing a procedure of a path planning method.

The path planning method will be described below. FIG. 5 is a flowchart showing a procedure of path planning according to the present embodiment, FIG. 6 a flowchart showing a procedure subsequent to FIG. 5, and FIG. 7 a flowchart showing an intermediate process in FIG. 6.

In the path planning according to the present embodiment, as shown in FIG. 5, the initial configuration-final configuration input device 2 first feeds the initial configuration and final configuration (S1). The initial configuration of the arm 5 can be known by angles of the respective links 31-37, and the final configuration of the arm 5 can be known by a state in which the glass grasped by the arm 5 is placed on the mount surface. These initial configuration and final configuration are determined based on angles of the actuators in the respective links 31-37 of the arm 5, and the specifications of the arm 5 represented by the physical data 22 obtained with reference to the database 20. The initial configuration and final configuration of the arm 5 are appropriately set and entered on the work space by an operator. If these positions are preset in advance, this input of configurations is not necessary. It is also possible to adopt a setup wherein the initial configuration is defined by a current configuration and wherein the final configuration is automatically set based on a simple command of an operator or commander.

After the initial configuration and final configuration are entered, environment recognition is carried out (S2). In the environment recognition, the image input device 3 first feeds external environment data to the database 20. The database 20 outputs the preliminarily stored environment data 21 and the external environment data fed from the image input device, to the constraint path generating device 10. The environment data 21 preliminarily contains information about obstacles existing around the arm 5, and the external environment data contains data of obstacles imaged by the camera of the image input device 3. The constraint path generating device 10 imports these environment data 21 and external environment data and performs the environment recognition. The initial configuration and final configuration of the arm determined in the work space are transformed onto the joint angle space being the movable space of the present invention, and each is represented by points on the joint angle space.

After the environment recognition is carried out in this manner to express the initial configuration and final configuration as points in the joint space, mid-configurations of the arm 5 are generated at random on the movable space defined based on the degrees of freedom of arm 5 to determine the configuration of the arm 5, i.e., on the joint angle space in the present embodiment (S3). In the joint angle space Q, there are the initial configuration $q_S$ and the final configuration $q_G$ with predetermined vectors indicating the initial configuration and the final configuration fed at step S1. Mid-configurations q ($q_1, q_2, \ldots$) with vectors are generated at random by a known technique using a stochastic mechanism (cf aforementioned [Non-patent Document 1] or the like), between these initial configuration $q_S$ and final configuration $q_G$.

After the mid-configurations are generated, the mid-configurations are projected onto a constraint surface V defined as a constraint in the present invention (S4). The constraint surface V will be described below.

As described above, the arm 5 is in the positional configuration expressed by $^R T_E$, relative to the reference coordinate system in the work space. $^R T_E$ is represented specifically by Eq (2) below.

$$^R T_E = \begin{bmatrix} ^R \Theta_E & ^R p_E \\ 0 & 1 \end{bmatrix} \quad (2)$$

In this equation, $^R\Theta_E$ represents a rotating matrix that defines a configuration of arm 5, and $^R p_E$ a wrist position vector of the arm with respect to the reference coordinate system. $^R\Theta_E$ can be expressed as $^R\Theta_E = [e_1 e_2 e_3]$, using an orthonormal basis $\{e_1, e_2, e_3\}$.

Figure 4:
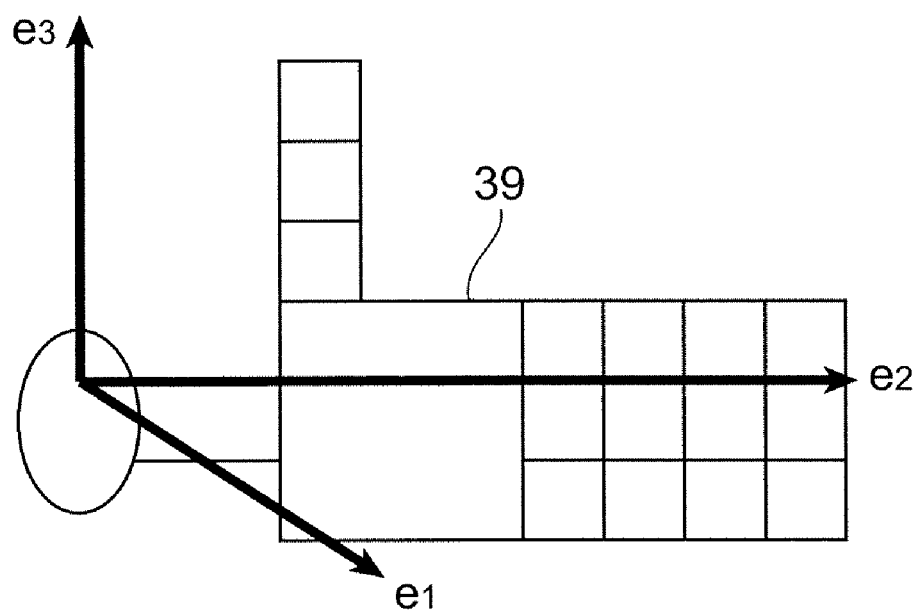
FIG. 4 is a diagram showing a coordinate system of a hand.

Let us suppose that vectors defining a hand configuration of the hand 39 shown in FIG. 4 are vector $e_3$ being a vector along the vertical direction, and vectors $e_1$, $e_2$ as vectors perpendicular to the vector $e_3$ and perpendicular to each other. Let an orthonormal basis of the reference coordinate system be $\{^R e_x, ^R e_y, ^R e_z\}$. Then a hand constraint for keeping the liquid in the glass from spilling out is given by Eq (3) and Eq (4) below.

$$h_1(q) = \langle ^R e_x, e_3 \rangle = 0 \quad (3)$$

$$h_2(q) = \langle ^R e_y, e_3 \rangle = 0 \quad (4)$$

In these equations, $\langle , \rangle$ represents a Euclidean inner product.

The constraint surface (constraint subspace) V in the joint angle space Q is given by Eq (5) below. The arm 5 has 7-dimensional degrees of freedom as described previously, while the constraint surface V is a 5-dimensional space.

$$V = \{q \in Q \subset R^7 | h_1(q) = 0, h_2(q) = 0\} \quad (5)$$

Furthermore, a vector-valued function h(q) is defined as represented by Eq (6) below.

$$h(q) = (h_1(q), h_2(q))^T \quad (6)$$

In Eq (6), T represents a transposition.

Since a mid-configuration q is generated at random in the joint angle space Q, a configuration of the arm 5 defined by the mid-configuration q is also random, and it can be one in which the liquid in the glass can be spilt. In contrast to it, when a mid-configuration q is on the constraint surface V, a configuration of the arm 5 defined by the mid-configuration q is one in which the surface of the glass grasped by the hand 39 of the arm 5 is horizontal. Therefore, when a path is planned using projected mid-configurations resulting from the projection of respective mid-configurations onto the constraint surface V, the path for moving the glass can be planned without spilling the liquid in the glass grasped by the hand 39.

After the mid-configurations q are generated, the mid-configurations q are then projected onto the constraint subspace V indicating the constraint subspace represented by Eq (5) above (S4). However, if a mid-configuration is sufficiently close to the constraint surface V on the basis of a certain standard, there is no need for the projection, and thus the projection is not carried out. The Newton method is applied in order to project a mid-configuration q onto the constraint surface V In this procedure, the Newton method is executed if a relation between a mid-configuration q and the constraint surface V meets a predetermined standard. If the relation does not meet the predetermined standard, another mid-configuration is generated again. In the present embodiment, when d(q) represented by Eq (A) below is smaller than a preset threshold, it is determined that the predetermined condition is satisfied.

$$d(q)\{h^T(q)h(q)\}^{1/2} \quad (A)$$

When a given projected mid-configuration is defined as $q_k \in R^7$, a tangent space of a graph of h(q) at $q_k$ is represented by Eq (8) below.

$$p - h(q_k) = (\partial h/\partial q)(q_k) \cdot (q - q_k) \quad (8)$$

In this equation, symbol "•" represents a product of a matrices. By transforming this Eq (8) with p=0, we can obtain Eq (9).

$$q = q_k - (\partial h/\partial q)^\dagger (q_k) \cdot h(q_k) \quad (9)$$

In this equation, the matrix $(\partial h/\partial q)^{554}(q_k)$ is a generalized inverse matrix of the matrix $(\partial h/\partial q)(q_k)$. Specifically, it is expressed by Eq (10) below.

$$(\partial h/\partial q)^\dagger (q_k) = (\partial h/\partial q)^T(q_k)[\partial h/\partial q(q_k)(\partial h/\partial q)^T(q_k)]^{-1} \quad (10)$$

Considering this projected mid-configuration $q_k$ as an update configuration (point), the next projected mid-configuration $q_{k+1}$ to the projected mid-configuration $q_k$ is updated by Eq (11) below.

$$q_{k+1} = q_k - (\partial h/\partial q)^\dagger (q_k) \cdot h(q_k) \quad (11)$$

This Eq (11) is an update formula in the Newton method. In this manner, the mid-configurations $q_1, q_2, \ldots$ are projected onto the constraint surface V to obtain the projected mid-configurations $q_k$.

Whether the constraint is approximately satisfied is determined by whether d(q) represented by Eq (A) above is greater than a preset threshold. The threshold herein is set to a sufficiently smaller value than the threshold used in determining whether the Newton method is to be executed.

After the mid-configurations are projected onto the constraint surface V, it is then determined whether the mid-configurations interfere with any environmental object (S5). For determining whether the mid-configurations interfere with any environmental object, the mid-configurations generated in the joint angle space Q are transformed each into the work space. In the work space, the mid-configurations are compared with the obstacle information. If a mid-configuration comes into contact with an obstacle, it is determined that the mid-configuration interferes with an environmental object.

When the result of this determination is that a mid-configuration is determined to interfere with an environmental object, the processing returns to step S3 to generate other mid-configurations at random in the joint angle space. On the other hand, when the mid-configurations are determined not to interfere with any environmental object, attention is focused on an arbitrary projected mid-configuration $q_k$ among the projected mid-configurations $q_1, q_2, \ldots$ generated at random. In the joint angle space Q, the projected mid-configuration $q_k$ in focus and a projected mid-configuration $q_{k+1}$ closest on the final configuration $q_G$ side to the projected mid-configuration $q_k$ (which is the final configuration $q_G$ in a state in which only one mid-configuration is generated) are connected with a straight line, and an on-line projected mid-configuration $q_1$ is generated on the connecting straight line (S6). The number of such on-line projected mid-configurations to be generated herein may be only one, or two or more. Only one on-line projected mid-configuration $q_1$ is generated herein.

Figure 6:
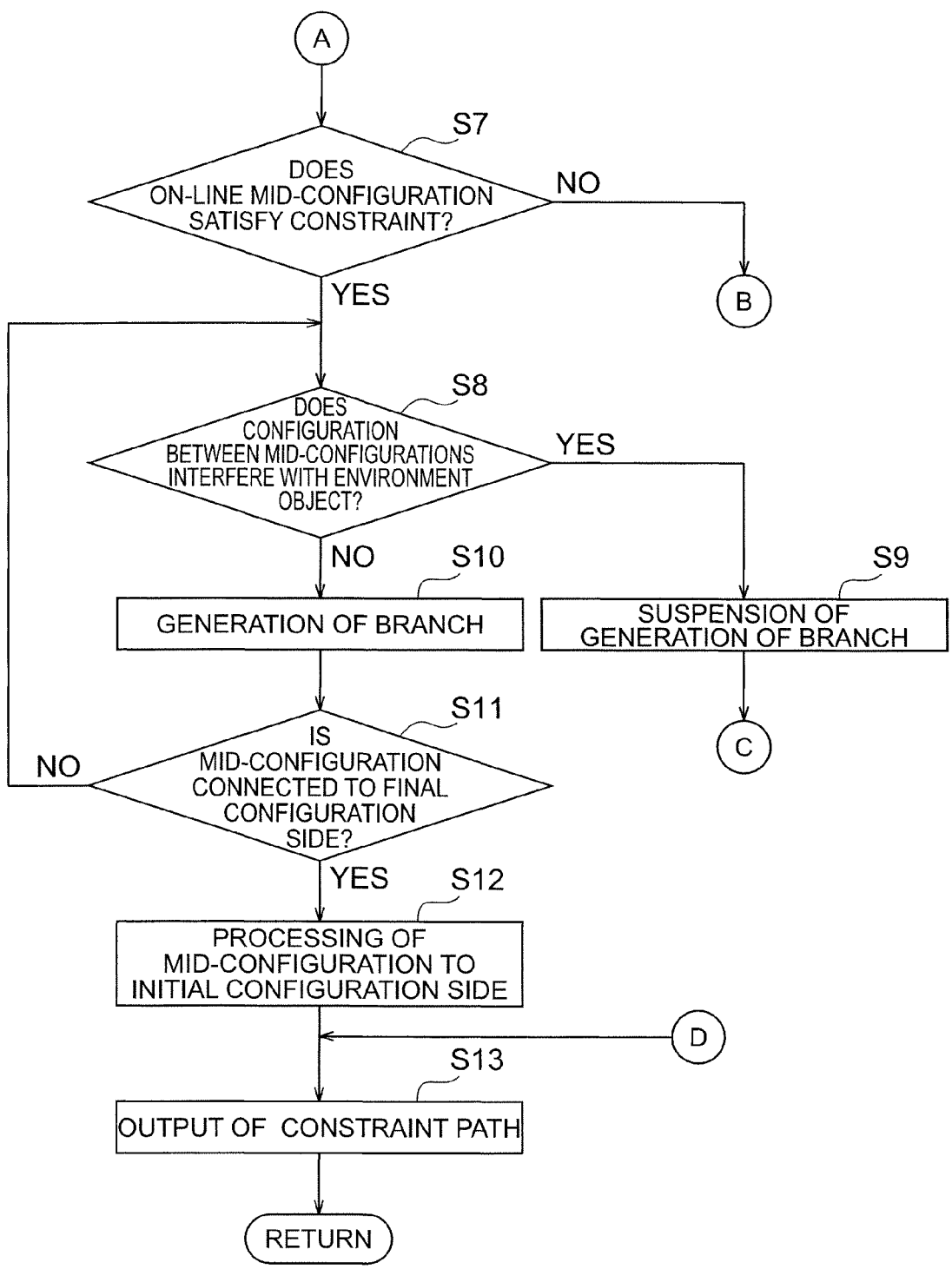
FIG. 6 is a flowchart showing a procedure subsequent to FIG. 5.
Figure 7:
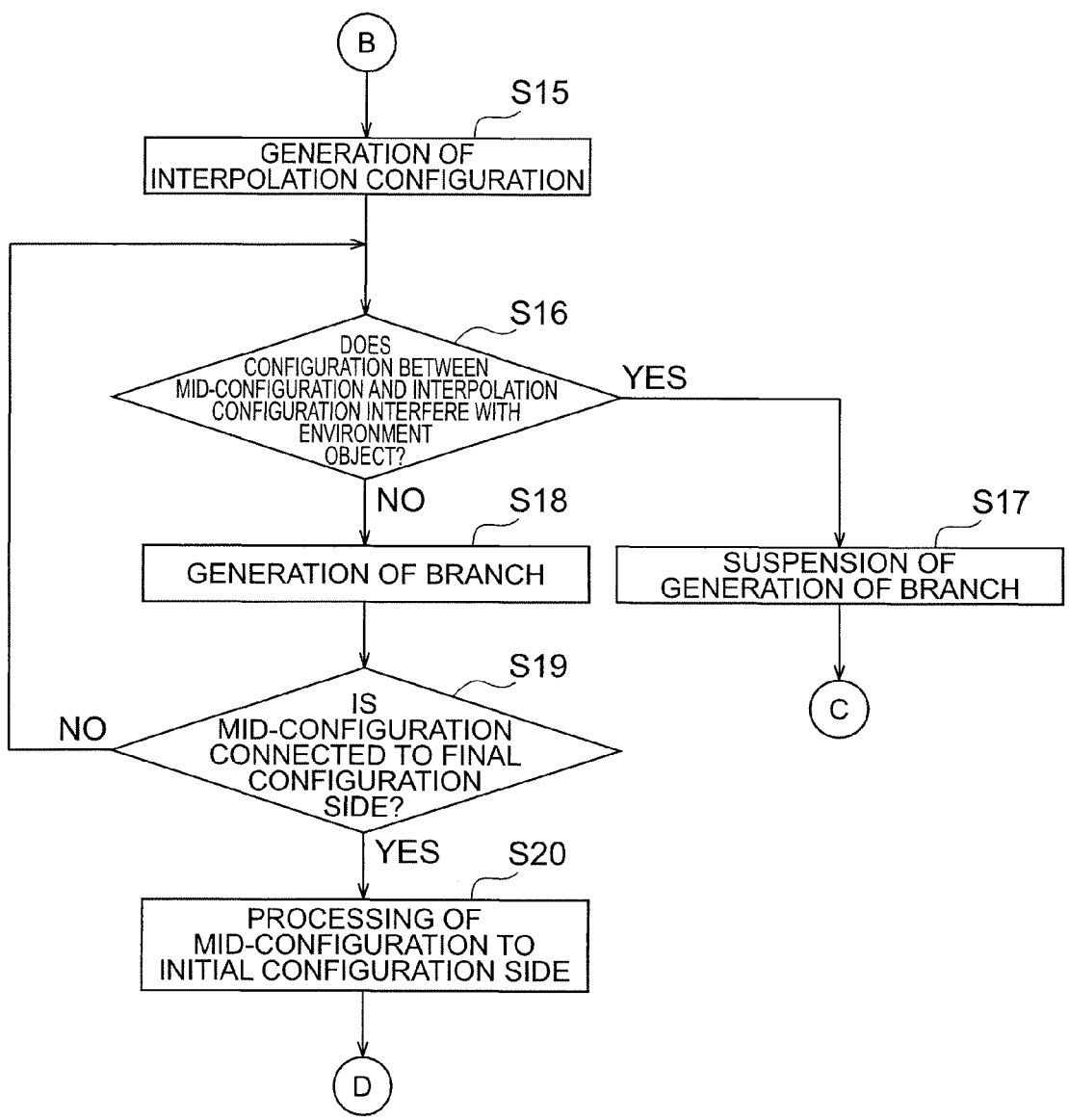
FIG. 7 is a flowchart showing a procedure subsequent to FIG. 6.
Figure 8:
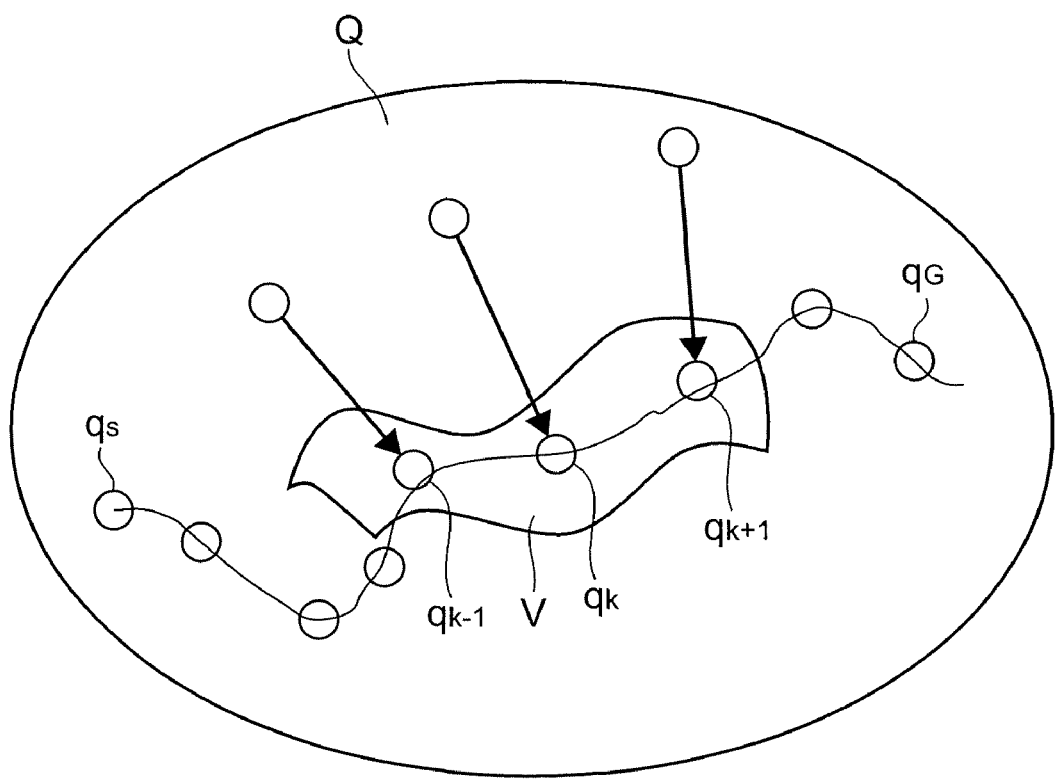
FIG. 8 is a diagram showing an image of a joint angle space.

After the on-line projected mid-configuration $q_1$ is generated, it is determined, as shown in FIG. 6, whether the on-line projected mid-configuration $q_{k1}$ generated satisfies the constraint (S7). The determination on whether the constraint is satisfied is carried out by whether the on-line projected mid-configuration is on the constraint surface V. When the result of the determination is that the constraint is not satisfied, an interpolation configuration is newly generated. The generation of the interpolation configuration will be described later.

On the other hand, when it is determined that the constraint is satisfied, it is determined whether configurations between the projected mid-configuration $q_k$ and the next projected mid-configuration $q_{k+1}$ interfere with any environmental object (S8). The determination on whether configurations between the projected mid-configuration $q_k$ and the next projected mid-configuration $q_{k+1}$ interfere with any environmental object is made by the following interference determination.

In the interference determination, a line segment connecting the projected mid-configuration $q_k$ and the next projected mid-configuration $q_{k+1}$ is further divided into smaller intervals, and the interference determination is carried out for every boundary between the smaller intervals. This determination in the smaller intervals is sequentially carried out from the next projected mid-configuration $q_{k+1}$ side toward the projected mid-configuration $q_k$ side. The "predetermined length" and "smaller intervals" herein are based on distances in the joint angle space.

This can reduce the computational load. In practical interference determination, position coordinates of a boundary between the foregoing smaller intervals in the joint angle space Q are transformed into the practical work space and the transformed coordinates are compared with the preliminarily input information of environmental objects (obstacles) to determine the presence/absence of interference on the work space.

When the result of the determination is that interference occurs, generation of a branch is suspended (S9) and the processing returns to step S3 to generate new mid-configurations in the joint angle space. On the other hand, when it is determined that no interference occurs, a branch is generated (S10). The generation of a branch herein means that the straight line between the projected mid-configuration $q_k$ and the next projected mid-configuration $q_{k+1}$ is settled as a path.

After the generation of branch, it is then determined whether the projected mid-configuration $q_k$ arbitrarily focused at step S6 and the final configuration $q_G$ are connected with a branch (S11). When the result of the determination is that the mid-configuration and the final configuration are not connected with a branch, the processing returns to step S8 to perform a similar process with the next projected mid-configuration $q_{k+1}$ to that in the case of the projected mid-configuration $q_k$, whereby a branch is further generated. When it is determined that the projected mid-configuration $q_k$ and the final configuration $q_G$ are connected with a branch, the process between the projected mid-configuration $q_k$ and the final configuration $q_G$ is carried out between the projected mid-configuration $q_k$ and the initial configuration $q_S$ to perform a process of connecting the projected mid-configuration $q_k$ and the initial configuration $q_S$ with a branch (S12).

When the initial configuration and the final configuration are connected with branches in this manner, a path consisting of the branches is outputted (S13). The path planning is completed in this manner.

Subsequently, we will describe a case where step S7 results in determining that the constraint is not satisfied and where an interpolation configuration is generated. When the straight line between the projected mid-configuration $q_k$ and the next projected mid-configuration $q_{k+1}$ does not satisfy the constraint, the configuration of the arm 5 is disturbed between the projected mid-configuration $q_k$ and the next projected mid-configuration $q_{k+1}$ so that water in the glass can be spilt. In order to avoid an accident of spilling water in the glass as described above, an interpolation configuration is generated between the projected mid-configuration $q_k$ and the next projected mid-configuration $q_{k+1}$.

Figure 9:
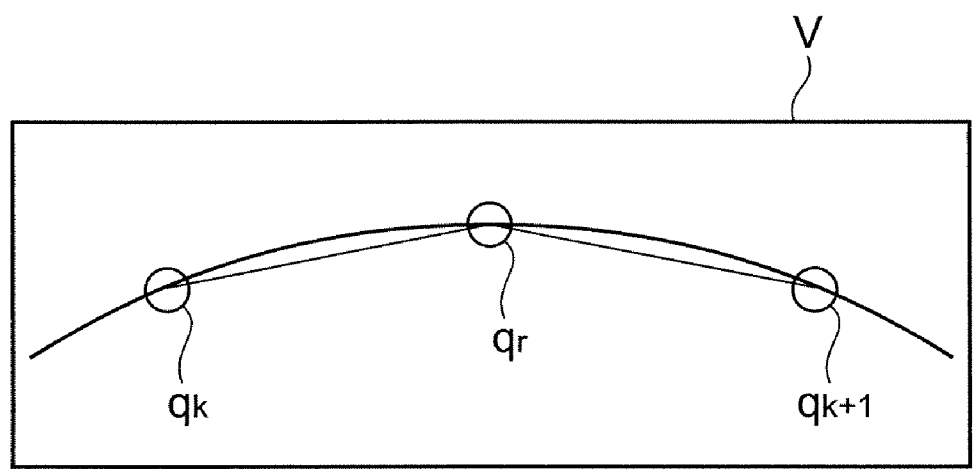
FIG. 9 is a diagram showing an interpolation configuration in the joint angle space.

In the generation of the interpolation configuration, the on-line projected mid-configuration between the projected mid-configuration $q_k$ and the next projected mid-configuration $q_{k+1}$ is projected onto the constraint surface V and, as shown in FIG. 9, this projected configuration is generated as an interpolation configuration $q_r$ (S15). By generating this interpolation configuration $q_r$, it is feasible to prevent water in the glass from spilling out.

Figure 10:
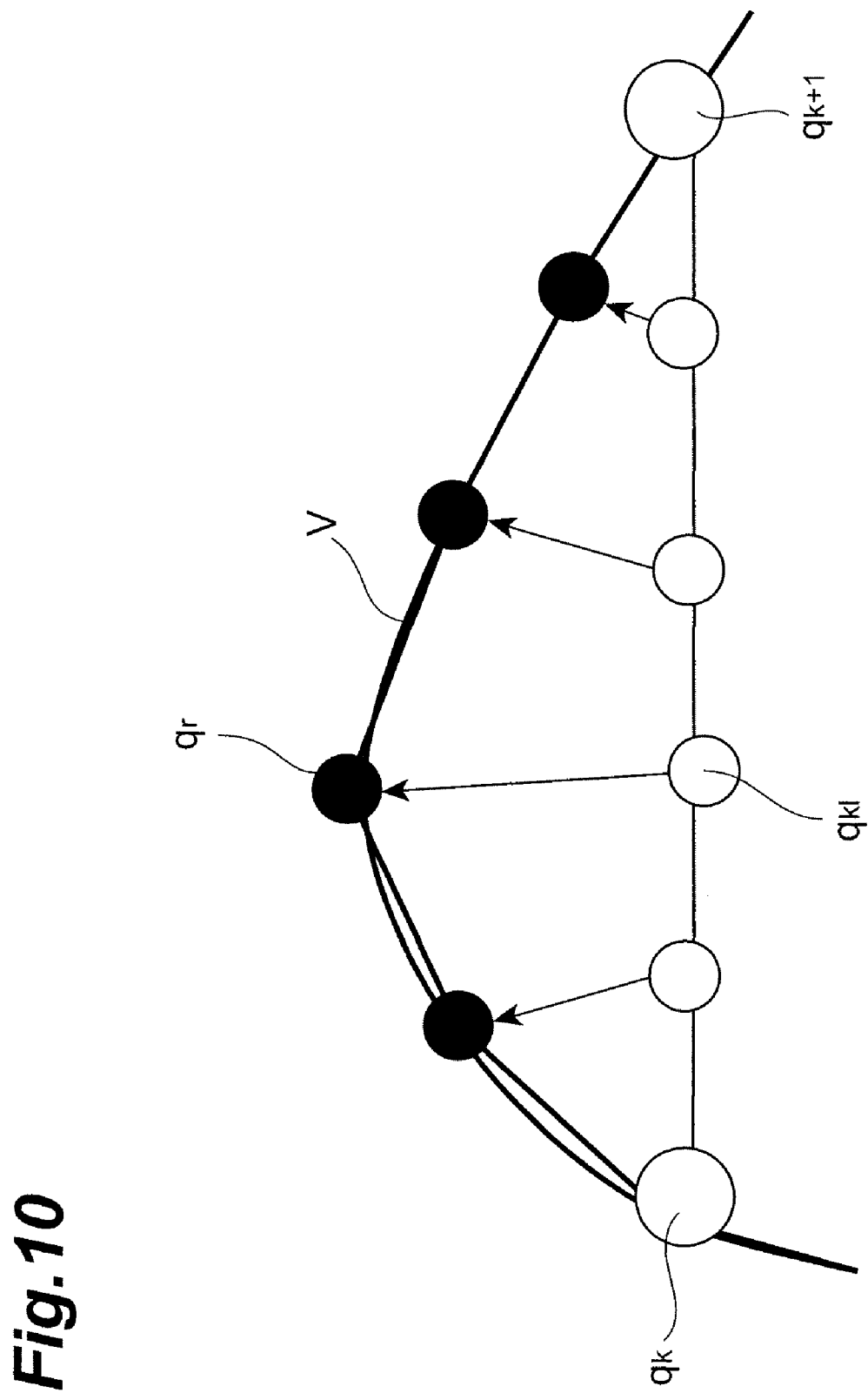
FIG. 10 is a diagram for explaining a procedure of generating an interpolation configuration in the joint angle space.

The interpolation configuration $q_r$ is generated as follows. After all the mid-configurations to be constrained are projected onto the constraint surface V, point $q_{k+1}$ and point $q_k$ are connected with a straight line to generate a line segment $q_{k+1}q_k$, as shown in FIG. 10. This line segment $q_{k+1}q_k$ is divided based on a unit length preliminarily given, to generate division points $q_{k1}$. At each of the division points $q_{k1}$, closeness to the constraint surface V is evaluated by whether d(q) represented by Eq (A) above is greater than a preset threshold. When the result of the evaluation by Eq (A) above is that a certain division point $q_{k1}$ exceeds the predetermined threshold, it is determined that the straight line between the projected mid-configuration $q_k$ and the next projected mid-configuration $q_{k+1}$ does not satisfy the constraint, and this division point $q_{k1}$ is projected to a position sufficiently close to the constraint surface V by the Newton method, to generate an interpolation configuration $q_r$.

After the interpolation configuration $q_r$ is generated, it is determined whether a configuration between the projected mid-configuration $q_k$ and the interpolation configuration $q_r$ interferes with any environmental object (S16). The determination on whether the configuration between the projected mid-configuration $q_k$ and the interpolation configuration $q_r$ interferes with any environmental object is carried out in the same manner as the determination at step S8 on whether the configuration between the projected mid-configuration $q_k$ and the next projected mid-configuration $q_{k+1}$ interferes with any environmental object.

When the result of the determination is that the configuration between the projected mid-configuration $q_k$ and the interpolation configuration $q_r$ interferes with an environmental object, generation of a branch is suspended (S17) and the processing returns to step S3. On the other hand, when it is determined that the configuration between the projected mid-configuration $q_k$ and the interpolation configuration $q_r$ does not interfere with any environmental object, a branch is generated between the projected mid-configuration $q_k$ and the interpolation configuration $q_r$, and a branch between the interpolation configuration $q_r$ and the next projected mid-configuration $q_{k+1}$ (S18).

It is then determined whether the projected mid-configuration $q_k$ focused arbitrarily at the step S3 and the final configuration $q_G$ are connected with a branch (S19). When the result of the determination is that they are not connected with a branch, the processing returns to step S16 to perform a similar process with the next projected mid-configuration $q_{k+1}$ to that with the projected mid-configuration $q_k$, to further generate branches. When it is determined that the projected mid-configuration $q_k$ and the final configuration $q_G$ are connected with a branch, the process between the projected mid-configuration $q_k$ and the final configuration $q_G$ is carried out between the projected mid-configuration $q_k$ and the initial configuration $q_S$ to perform a process of connecting the projected mid-configuration $q_k$ and the initial configuration $q_S$ with a branch (S20).

When the initial configuration and the final configuration are connected with branches in this manner, the path consisting of the branches is outputted (S13). The path planning is completed in this manner.

As the path of the arm 5 is generated by sequentially generating the mid-configurations on the constraint surface V formed in the joint angle space Q as described above, the glass can be moved without spilling water in the glass, while the arm 5 grasps the glass filled with water.

Figure 11:
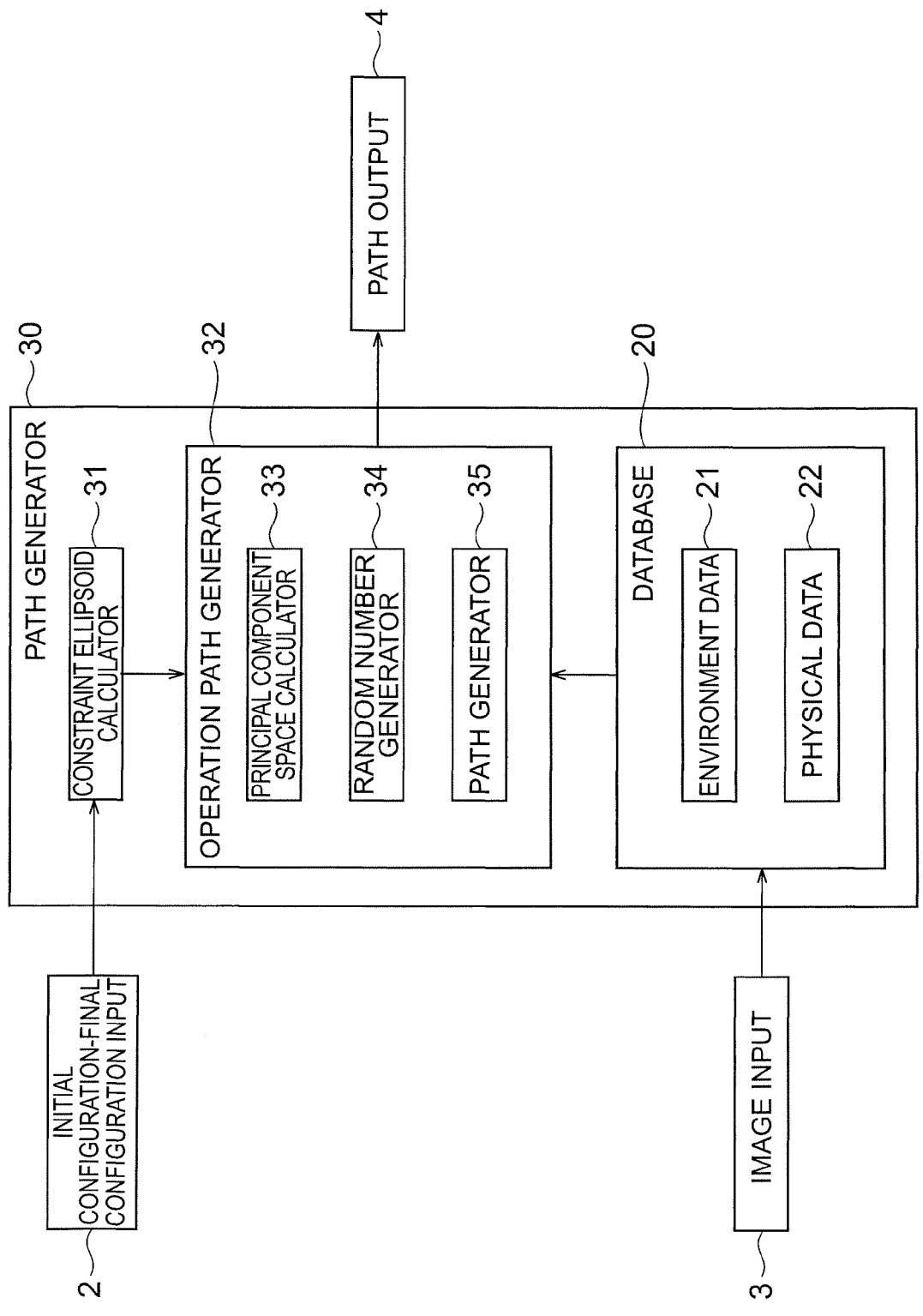
FIG. 11 is a block configuration diagram of a path planning apparatus according to a second embodiment.

Next, the second embodiment of the present invention will be described. The present embodiment is different mainly in the procedure of generating midpoints, from the first embodiment described above. FIG. 11 is a block configuration diagram of a path planning apparatus according to the present embodiment. The second embodiment will be described below with focus on the procedure of generating midpoints.

As shown in FIG. 11, the path planning apparatus according to the present embodiment, when compared with the first embodiment, is different mainly in a configuration of a path generating device 30 and has much the same configurations for the other components. The path generating device 30 is provided with the database 20 similar to that in the first embodiment and, in addition, has a constraint ellipsoid calculator 31 and an operation path generator 32. The operation path generator 32 is comprised of a principal component space calculator 33, a random number generator 34, and a path generator 35. In the present embodiment the constraint ellipsoid calculator 31 and operation path generator 32 serve as the midpoint generating means of the present invention.

The constraint ellipsoid calculator 31 calculates a constraint ellipsoid used for generating a path connecting the initial configuration and the final configuration fed from the initial configuration-final configuration input device 2. For calculating the constraint ellipsoid, a degrees-of-freedom change amount (or a constraint amount of a degrees-of-freedom change rate) to be constrained in the joint angle space is calculated as an ellipsoid by a tangent space of the constraint expressed by a function of a variable in the joint angle space and a variable in the work space. A principal component with large degrees of freedom is extracted based on an axial length of this ellipsoid. The constraint ellipsoid calculator 31 defines a constraint degree by a volume of the calculated constraint ellipsoid.

The constraint ellipsoid calculator 31 outputs the calculated constraint ellipsoid to the operation path generator 32. The operation path generator 32 generates an operation path of the robot, using the constraint ellipsoid fed from the constraint ellipsoid calculator 31, and the environment data and the physical data of the robot fed from the database 20. The operation path generator 32 outputs the generated operation path to the path output device 4.

The function of the operation path generator 32 will be further described. The principal component space calculator 33 in the operation path generator 32 performs a principal component analysis of a positive semidefinite symmetric matrix which defines the constraint ellipsoid fed from the constraint ellipsoid calculator 31, to analyze principal components of the constraint ellipsoid. The random number generator 34 determines a probability distribution by the principal components analyzed by the principal component space calculator 33, and generates a random number as a candidate for generation of an operation path, based on this probability distribution. This random number is a number indicating a configuration of the robot.

The random number generator 34 outputs the generated random number to the path generator 35. The path generator 35 determines whether the random number generated by the random number generator interferes with the environment data fed from the database 20, and generates a sequential operation path by connecting a plurality of random numbers determined not to interfere.

Next, a path planning method according to the present embodiment will be described. The method will be described with the case using the robot described in the first embodiment, as an example, for carrying out the path planning. The present embodiment is different from the first embodiment mainly in that, for generating midpoints, a constraint ellipsoid is defined as a constraint. A procedure of defining the constraint ellipsoid will be described below. The definition of the constraint ellipsoid is carried out in the constraint ellipsoid calculator 31. In the present embodiment, a constraint midpoint generated is determined in the form of a joint variable vector q as a variable in the joint angle space of the automated machine, and the joint variable vector q is expressed by Eq (19) below. Furthermore, for determining the joint variable vector q, a reference point is expressed as a reference joint variable vector $q_0$. Namely, an ellipsoid is generated as centered on $q_0$ satisfying the constraint, and a point $q_1$ fully satisfying the constraint is generated using the ellipsoid. Configurations satisfying the constraint are generated by repeating the above operation. In Eq (19) below, n represents a total number of degrees of freedom. Here C represents the joint angle space.

$$q \in C \subseteq R_n \tag{19}$$

In the coordinate systems at the respective links of the arm shown in FIG. 3, each coordinate system determined by a set of three vectors $(x_i, y_i, z_i)$ is denoted by $\Sigma_i$. In this case, $\Sigma_E$ represents the hand position configuration coordinate system, and $\Sigma_R$ the base coordinate system. The positional configuration of the hand 39 is expressed by Eq (1) described in the foregoing first embodiment. By ${}^R T_E$ determined by this Eq (1), a wrist position vector p of the hand 39 is expressed by Eq (20) below.

$$p = (x, y, z)^T \tag{20}$$

Since ${}^1 T_7$ is a function of the joint variable vector q, if values of link parameters are given, a relational expression between the joint variable vector q of the 7-degrees-of-freedom arm and the vector p of the wrist position with respect to the base coordinate system is determined as Eq (21) below.

$$p = f(q, L) \tag{21}$$

In this equation $L = (L_1, L_2, L_3, L_4, L_5, L_6, L_7)^T$.

Subsequently, we will describe the robot with seven degrees of freedom moving in the work space represented by $(x, y, z)^T$.

The joint variable vector q in the joint angle space is expressed by Eq (22) below.

$$q = (q_1, q_2, q_3, q_4, q_5, q_6, q_7) \tag{22}$$

Then x, y, and z can be expressed by Eq (23-1) to Eq (23-3) below, respectively.

$$x = f_1(q, L) \tag{23-1}$$

$$y = f_2(q, L) \tag{23-2}$$

$$z = f_3(q, L) \tag{23-3}$$

Let us suppose herein that in the work space there is a constraint for the wrist position vector p as represented by Eq (24-1) to Eq (24-m) below.

$$g_1(p) = 0 \qquad (24\text{-}1)$$

$$g_2(p) = 0 \qquad (24\text{-}2)$$

$$g_3(p) = 0 \qquad (24\text{-}3)$$

$$\vdots$$

$$g_m(p) = 0 \qquad (24\text{-}m)$$

By putting Eqs (23) above (Eq (23-1) to Eq (23-3)) into Eqs (24) (Eq (24-1) to Eq (24-m)), we obtain the constraint for the joint variable vector q. This equation can be abbreviated to Eq (25) below.

$$h(q)=0 \qquad (25)$$

In this equation, $h(q)=(g_1(p(q)), \ldots, g_m(p(q)))^T$.

Since the link lengths of the respective links 31-37 are assumed to be constant, Eq (25) can be considered as an equation of the joint variable vector q. Degrees of freedom of the joint variable vector q satisfying this Eq (25) are at most (7-m) dimension (m≦6) in the joint angle space.

At this time, a tangent space of a graph of Eq (25) differentiable at the differentiable reference joint variable vector $q_0$ can be expressed by Eq (26) below.

$$J \cdot dq = 0 \qquad (26)$$

In this equation, $dq=q-q_0$, and J a Jacobian matrix of function h.

Subsequently, let us consider a quadratic form represented by Eq (27) below.

$$dq^T \cdot U^T \cdot (J^T J) \cdot U \cdot dq = 0 \qquad (27)$$

When we define U as an orthogonal matrix that diagonalizes the matrix $J^T J$, Eq (27) can be expressed as Eq (28) below.

$$dq^T \cdot U^T \cdot \begin{bmatrix} \Sigma & 0 \\ 0 & 0 \end{bmatrix} \cdot U \cdot dq = 0, \qquad (28)$$

where $\Sigma = \mathrm{diag}(\sigma_1, \sigma_2, \sigma_3, \ldots, \sigma_k) > 0$.

We can obtain Eq (29) below from Eq (27) above.

$$[U_{11} U_{12}]q = [U_{11} U_{12}]q_0 \qquad (29),$$

where $$\begin{bmatrix} U_{11} & U_{12} \\ U_{21} & U_{22} \end{bmatrix},$$

$U_{11}$ is a k×k matrix, and $U_{12}$ a k×(7−k) matrix.

Furthermore, supposing Eq (30) below is a k×7 matrix, we can obtain Eq (31) below, using Eq (29) above. This Eq (31) can be rewritten into Eq (32).

$$\tilde{U} \stackrel{def}{=} (U_{11} U_{12}) \qquad (30)$$

$$q^T \tilde{U}^T \sum \tilde{U} q = q_0^T \tilde{U}^T \sum \tilde{U} q_0 \qquad (31)$$

$$q^T \tilde{U}^T \left( \sum / q_0^T \tilde{U}^T \sum \tilde{U} q_0 \right) \tilde{U} q = 1 \qquad (32)$$

The part between $q^T$ and q on the left-hand side in Eq (32) above is a positive semidefinite symmetric matrix. For this reason, Eq (32) is an equation representing an ellipsoid. The ellipsoid represented by Eq (32) above is the constraint ellipsoid of the present invention. The path calculation is performed using such a constraint ellipsoid.

After the constraint ellipsoid calculator 31 sets the constraint ellipsoid in this manner, the principal component space calculator 33 in the operation path generator 32 defines a principal component space of this constraint ellipsoid. The principal component space of the constraint ellipsoid represented by Eq (32) is a corresponding subspace of the positive semidefinite symmetric matrix defining the constraint ellipsoid. This subspace is defined as the principal component space.

After the principal component space of the constraint ellipsoid is defined, the random number generator 34 defines a probability distribution on the principal component space of the constraint ellipsoid. This probability distribution can be defined, for example, by generating a generalized Gaussian distribution. Specifically, an autocovariance matrix $\Sigma'$ is defined by Eq (33) below. The autocovariance matrix $\Sigma'$ is a singular matrix (which has no inverse matrix).

$$\sum\nolimits' \stackrel{def}{=} \tilde{U}^T \sum \tilde{U} / q_0^T \tilde{U}^T \sum \tilde{U} q_0 \qquad (33)$$

Random numbers are generated based on this autocovariance matrix $\Sigma'$ and the reference joint variable vector $q_0$. Among the random numbers generated herein, an arbitrary number is generated as a candidate for the joint variable vector q. The candidate for the joint variable vector q is generated using a generalized Gaussian distribution of the autocovariance matrix $\Sigma'$ with the reference joint variable vector $q_0$ as an average.

After the principal component space calculator 33 calculates the candidate for the joint variable vector q in this manner, the path generator 35 generates a line segment connecting the reference joint variable vector $q_0$ and the joint variable vector q. This line segment is determined as to whether the line segment collides with any obstacle, with reference to the environment data fed from the database 20.

When the result of the determination is that the line segment does not interfere with any obstacle, the joint variable vector generated is determined as a mid-configuration. Subsequently, this joint variable vector q is defined as a reference joint variable vector $q_0$ and another mid-configuration is determined in similar fashion. On the other hand, when it is determined that the line segment interferes with an obstacle, the random number generator 34 generates a different random number and repeats similar processing. A sequential operation path is generated in this manner.

The present embodiment used the generalized Gaussian distribution for generation of the random number, but can also adopt a form wherein a random number is generated by use of another probability distribution. In the generation of the random number, only one random number was generated, but it is also possible, for example, to adopt a form in which a plurality of random numbers are generated at a time and in which one of them, e.g., a random number close to the constraint, is used.

The above described the preferred embodiments of the present invention, but the present invention is by no means limited to the above embodiments. For example, the above embodiment was arranged to project a mid-configuration off the constraint surface, onto the constraint surface, in the projection of the mid-configuration onto the constraint surface, but it is possible to adopt a form in which the projection is not carried out for a mid-configuration in a predetermined range from the constraint surface and in which the mid-configuration is used for a path as it is. The generation of the interpolation configuration is not essential, and the path can also be generated without generation of the interpolation configuration.

INDUSTRIAL APPLICABILITY

The present invention is applicable to the path planning apparatus for planning an operation path of the whole or a part of automated machinery.

The invention claimed is:

1. A path planning apparatus for planning a path in movement of a moving object from an initial position to a final position, which is adapted to probabilistically generate a midpoint between the initial position and the final position and to plan a path between the initial position and the final position, using the midpoint, the path planning apparatus comprising:
constraint setting means for setting a constraint subspace satisfying a constraint to constrain a configuration of the moving object in a work space where the moving object exists, in a movable space defined based on degrees of freedom of the moving object to determine a configuration of the moving object;
midpoint generating means for generating a constraint midpoint by projecting a midpoint probabilistically generated in the movable space onto the constraint subspace;
path generating means for generating a path connecting the initial position and the final position using the constraint midpoint; and
path correcting means for correcting the generated path based on the constraint, wherein
the constraint setting means defines the constraint subspace satisfying the constraint in the movable space as the constraint,
the path correcting means corrects the path by performing a projection to project the path generated by the path generating means onto the constraint subspace, and
if a distance between the path generated by the path generating means and a constraint surface is not less than a predetermined value, then the path correcting means performs a projection onto the constraint surface to correct the path.

2. The path planning apparatus according to claim 1, wherein the path correcting means performs the projection at every predetermined interval in the path generated by the path generating means.

3. The path planning apparatus according to claim 1, wherein the constraint setting means sets the constraint, based on an equation defined by an inner product of a vector resulting from mapping of a variable in the movable space into the work space, and basis vectors of the work space.

4. A path planning apparatus for planning a path in movement of a moving object from an initial position to a final position, which is adapted to probabilistically generate a midpoint between the initial position and the final position and to plan a path between the initial position and the final position, using the midpoint, the path planning apparatus comprising:
a constraint setting module configured to set a constraint subspace satisfying a constraint to constrain a configuration of the moving object in a work space where the moving object exists, in a movable space defined based on degrees of freedom of the moving object to determine a configuration of the moving object;
a midpoint generator configured to generate a constraint midpoint by projecting a midpoint probabilistically generated in the movable space onto the constraint subspace;
a path generator configured to generate a path connecting the initial position and the final position using the constraint midpoint; and
a path corrector configured to correct the generated path based on the constraint, wherein
the constraint setting module defines the constraint subspace satisfying the constraint in the movable space as the constraint,
the path corrector corrects the path by performing a projection to project the path generated by the path generator onto the constraint subspace, and
if a distance between the path generated by the path generator and a constraint surface is not less than a predetermined value, then the path correcting means performs a projection onto the constraint surface to correct the path.

5. The path planning apparatus according to claim 4, wherein the path corrector performs the projection at every predetermined interval in the path generated by the path generator.

6. A path planning apparatus for planning a path in movement of a moving object from an initial position to a final position, which is adapted to probabilistically generate a midpoint between the initial position and the final position and to plan a path between the initial position and the final position, using the midpoint, the path planning apparatus comprising:
constraint setting means for setting a constraint subspace satisfying a constraint to constrain a configuration of the moving object in a work space where the moving object exists, in a movable space defined based on degrees of freedom of the moving object to determine a configuration of the moving object;
midpoint generating means for:
(1) setting a constraint ellipsoid satisfying an arbitrary position satisfying the constraint and a neighborhood point near said arbitrary position in the movable space,
(2) defining a probability distribution using the constraint ellipsoid, and
(3) generating a random number, based on the probability distribution, as a candidate constraint midpoint, the random number indicating a configuration of the moving object; and
path generating means for:
(a) generating a path connecting the initial position and the final position using the candidate constraint midpoint,
(b) determining whether the generated path interferes with an obstacle, and
(c) in response to determining the path interferes with an obstacle, causing the midpoint generating means to generate a different random number, based on the probability distribution, as a new candidate constraint midpoint and sequentially generating a path connecting the initial position and the final position using the candidate constraint midpoint.

* * * * *